Figure 1:
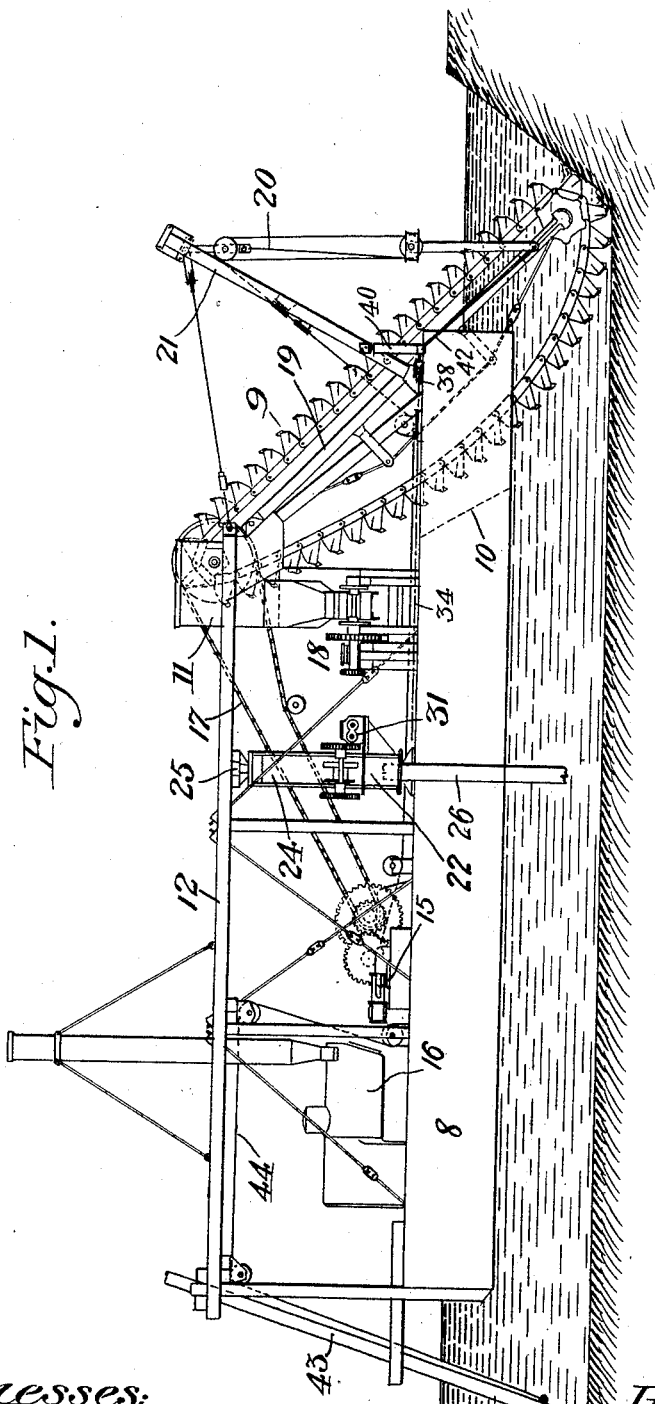

W. FERRIS & P. R. PARKER.
DREDGE.
APPLICATION FILED JUNE 1, 1909.

997,247.

Patented July 4, 1911.
5 SHEETS—SHEET 1.

Witnesses:

Inventors.

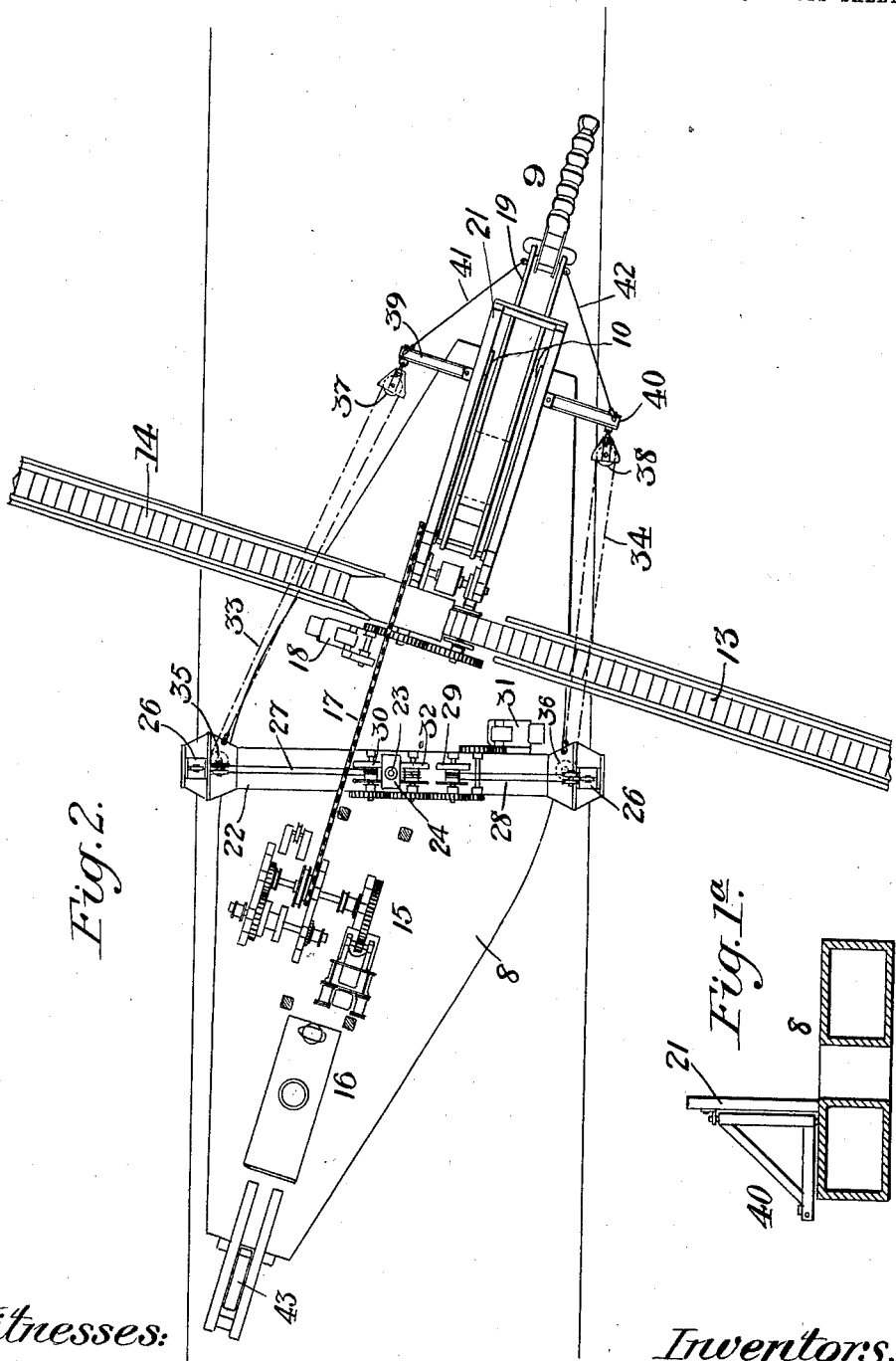

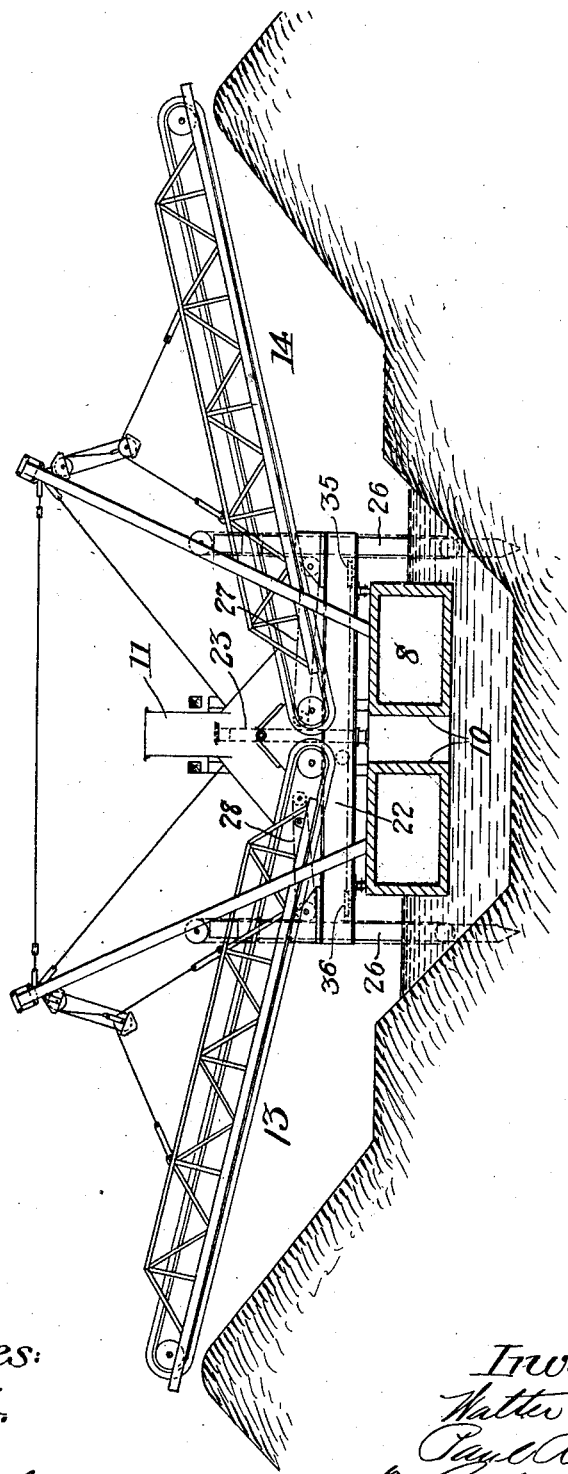

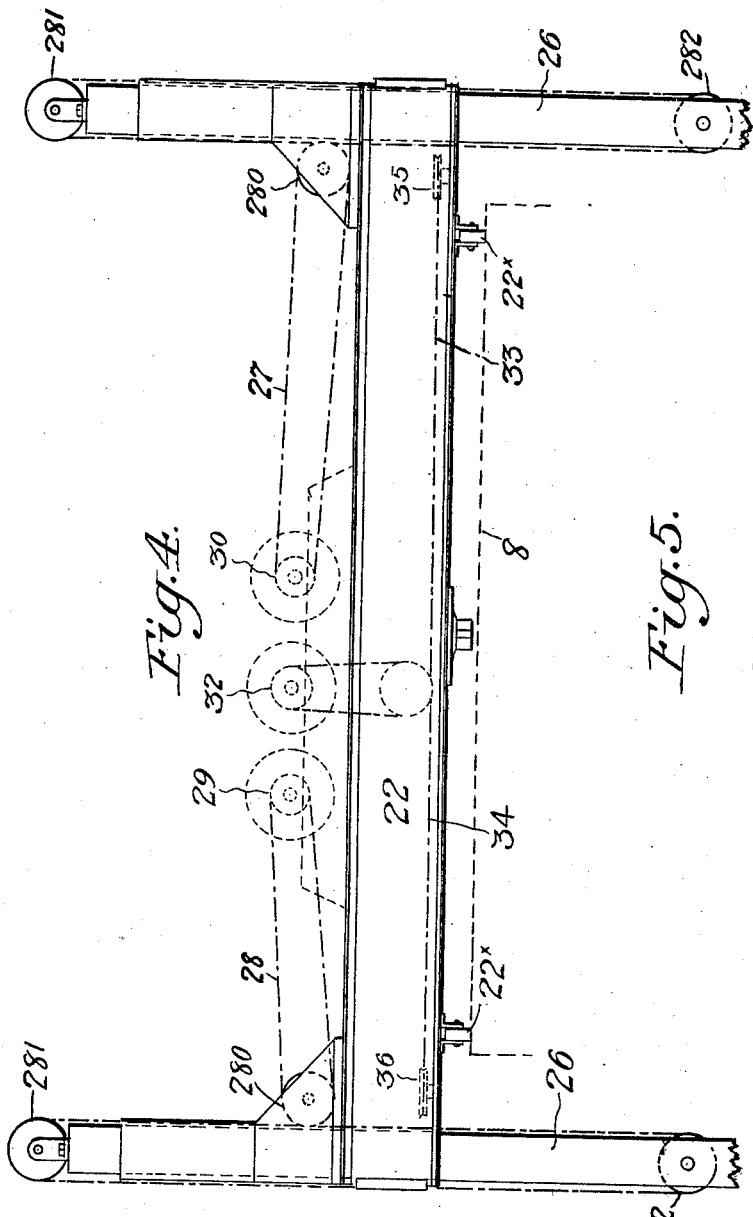
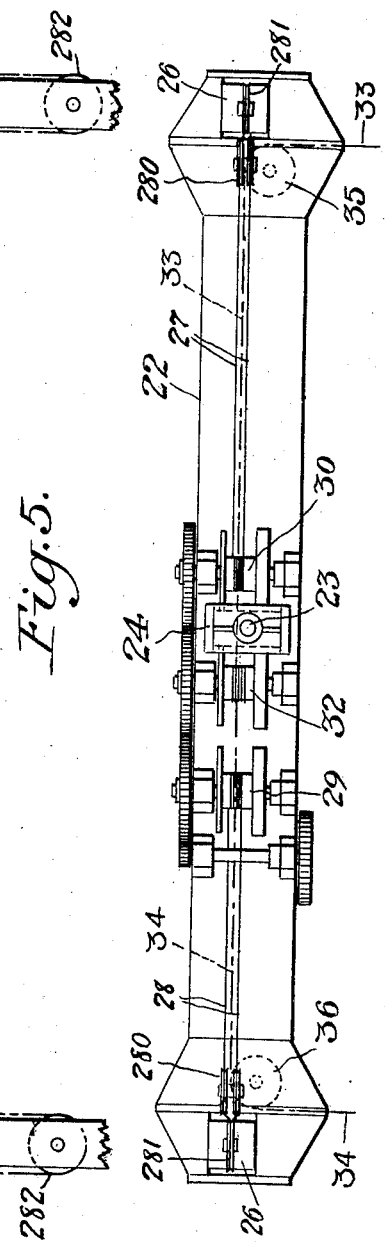

W. FERRIS & P. R. PARKER.
DREDGE.
APPLICATION FILED JUNE 1, 1909.

997,247.

Patented July 4, 1911.
5 SHEETS—SHEET 5.

Witnesses:

Inventors.

UNITED STATES PATENT OFFICE.

WALTER FERRIS, OF SOUTH MILWAUKEE, WISCONSIN, AND PAUL REVERE PARKER, OF SAN FRANCISCO, CALIFORNIA, ASSIGNORS TO THE BUCYRUS COMPANY, OF SOUTH MILWAUKEE, WISCONSIN, A CORPORATION OF WISCONSIN.

DREDGE.

997,247. Specification of Letters Patent. Patented July 4, 1911.

Application filed June 1, 1909. Serial No. 499,443.

*To all whom it may concern:*

Be it known that we, WALTER FERRIS and PAUL R. PARKER, citizens of the United States, the former residing at South Milwaukee, county of Milwaukee, State of Wisconsin, and the latter residing at San Francisco, county of San Francisco, State of California, have invented certain new and useful Improvements in Dredges; and we do hereby declare the following to be a full, clear, and exact description of the invention, such as will enable others skilled in the art to which it appertains to make and use the same.

This invention relates to dredges, and more especially dredges which are used in carrying on excavations in a canal, such as widening or deepening the canal.

The primary object of the invention is to provide improved means for anchoring and swinging the dredge and for advancing the same at the end of each traverse. The improved swinging and advancing means is of such a character that it may be employed in connection with dredges doing river and harbor work, as well as canal dredges.

In dredges as generally built, where the hull is swung to and fro on a spud acting as a pivot, the anchorages for swinging are obtained by leading ropes ashore from points near the bow at each side of the dredge and fastening such ropes to trees or other stationary objects which are sufficiently firm to stand the pull. These ropes are wound on winch drums operated by power on the dredge itself, and by winding in one rope and paying out the opposite rope, the bow of the dredge can be swung to the right or left. The difficulty in obtaining such anchorages has been a serious drawback to the use of the elevator type of dredge, either for digging in river or harbor work where the shores are distant, or in broad marshy river bottoms, where there are few or no trees and where the earth is frequently so soft that anchors are difficult to transport and will not hold when placed. To avoid these difficulties, we have devised a dredge, preferably of the elevator-conveyer type, which is provided with self-contained means whereby the hull may be swung to the right or left or advanced, such means providing for the firm support of the hull during excavation and for the forcing of the excavator into the cut as the work progresses.

In carrying out this invention, the hull may have pivoted to the deck thereof a cross beam or girder which traverses the deck and extends beyond the same at both ends, said ends of the cross beam or girder being equipped with anchoring spuds which can be raised and lowered by any suitable mechanism. The ends of the cross beam or girder are connected by ropes or cables with the forward part or bow of the hull, and during the excavation the spuds are firmly anchored in the earth, the rope or cable connections just referred to being so operated by means of suitable swinging machinery as to force the excavator in a lateral direction into the cut. The advance of the dredge, when such is necessary, may be effected by pulling up one of the spuds and by so acting on the swinging connection at that end of the cross beam or girder, that said end is advanced, in order to pull the hull forward to a certain extent. The raised spud is then lowered and the same operation is repeated at the opposite side of the dredge in order to advance the opposite end of the cross beam or girder to the same extent as the first named end and thus complete the advance movement, after which the raised spud is lowered. In order to provide against the lateral swinging of the dredge during its advance, a trailing spud or similar device is used at the stern, as will appear more fully from the following description.

Figure 6:
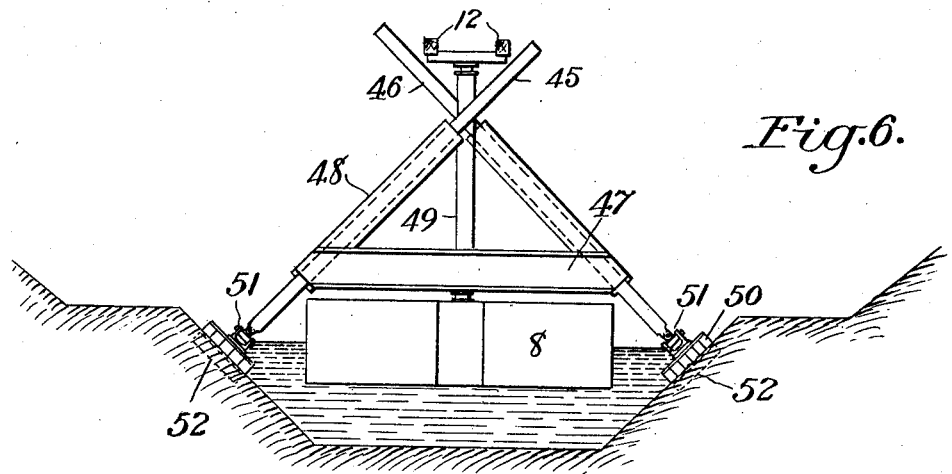
Figure 7:
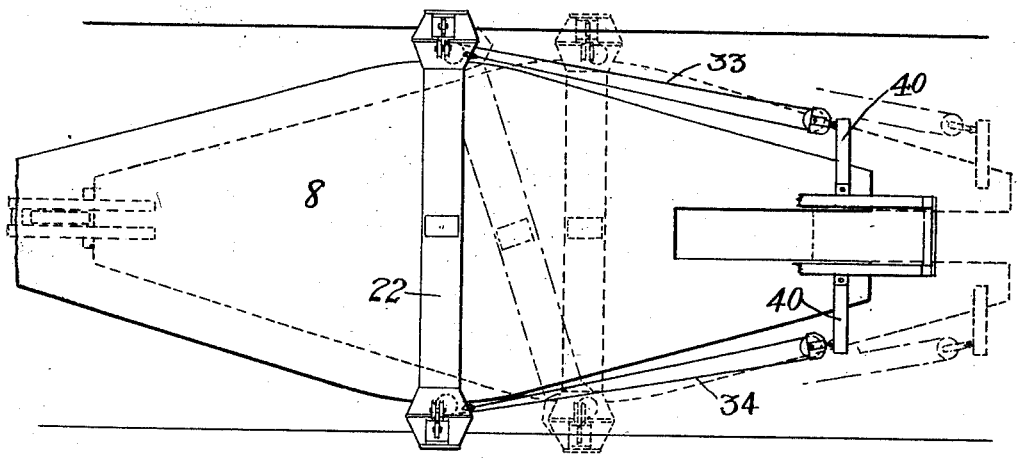

In the accompanying drawing, in which a preferred embodiment of the invention is illustrated, Figure 1 is a side elevation of the dredge, showing the same as used in canal excavation, Fig. 1$^a$ is a detail of one of the brackets embodied in the swinging tackle, Fig. 2 is a top plan view of the dredge showing how the excavator is forced laterally into the cut, Fig. 3 is a transverse section taken at a point in advance of the conveyers which carry off the excavated material, Fig. 4 is a detail elevation of the cross beam or girder and the digging spuds with which it is equipped, Fig. 5 is a top plan view of Fig. 4 showing the winch drums as mounted on the cross beam or girder, Fig. 6 is a diagrammatic view showing a modified arrangement of cross beam and digging spuds, and Fig. 7 is a diagram showing the manner in which the dredge is advanced as the work progresses.

The dredge illustrated in the drawing is of the type used especially in canal excavation and it is provided at the bow with an endless bucket excavator which delivers the excavated material on to two laterally extending conveyers operative to discharge the material upon opposite banks of the canal. However, it is to be understood that the particular type of dredge hull and of the excavating machinery forms no part of the present invention, which is chiefly concerned with the mechanism for causing the traverse of the dredge and its advance for each such traverse.

In the drawing, the dredge hull 8 is shown as being essentially fish-shaped in plan, which adapts it particularly for canal excavation; and at the bow of the hull is arranged the endless bucket excavator 9 which operates in a cut away portion 10 at the bow of the hull and delivers the excavated material into a hopper 11 carried at the forward end of the frame work 12, from which hopper the excavated earth is discharged on to endless conveyers 13, 14, which project laterally from the dredge and discharge the earth upon the banks of the canal, as shown in Fig. 3. The excavator 9 is driven from a main prime mover or engine 15 carried by the hull and supplied with steam from a boiler 16, the excavator being driven from said engine by means of an endless chain 17. The endless conveyers are driven by an engine 18. The excavator 9 embodies a ladder 19 which may be adjusted vertically by means of the tackle 20 which is suspended from the forwardly inclined frame 21 at the bow.

The invention consists in providing upon the deck of the hull an anchoring structure such as a cross beam or girder 22, the ends of which project laterally beyond the sides of the hull, as shown in Fig. 2, and such cross beam or girder is pivoted or swiveled to the hull by means of a pintle 23 extending upward through a post 24 placed on the cross beam at the center, the upper end of the pintle 23 being journaled between the main truss members at the top of the frame 12, as indicated at 25. At the ends of the cross beam 22 the same is equipped with vertically movable spuds 26 which are firmly anchored in the earth when the digging is carried on, and which we therefore term digging spuds. Said spuds are raised and lowered by any well known mechanism, which need not be described in detail here, but it may be stated that in the embodiment shown said mechanism comprises ropes 27 and 28 which are operated from winch drums 29, 30, placed on the upper surface of the cross beam at its intermediate portion. Each rope is wound about its drum and the end portions thereof are led over suitable sheaves 280 on the girder ends to and over sheaves 281, 282 on the corresponding spud, above and below the girder respectively, both extremities of the rope being attached to the girder as indicated in Fig. 4. In this way, a winding up of the portion of the rope passing over the spud, viz., over the upper sheave 281, by rotating the drum in one direction, will force the spud down, the portion of the rope passing under the lower spud sheave 282 being correspondingly paid out; and a movement of the drum in the opposite direction will wind up the last named portion of the rope and thereby raise the spud, the portion of the rope passing over the top sheave 281 being paid out correspondingly. The drums 29, 30 are driven from an engine 31 supported on the cross beam at the side, as shown in Fig. 2, and by driving these drums in proper direction the raising and lowering of the spuds 26 can be effected in the well known manner.

Located between the winch drums 29 and 30 and also driven from the engine 31 on the cross beam, is a third winch drum 32, as best shown in Fig. 5, and from said drum 32 ropes or cables 33, 34 are run over sheaves 35, 36, located at the ends of the cross beam, the ropes 33, 34, being carried over these sheaves and to the forward end of the hull, where they are passed over sheaves 37, 38, respectively carried by brackets 39, 40 at the bow, whence the ropes are conducted rearwardly and secured to the ends of the cross beam, as shown in Fig. 2.

The brackets 39, 40, are formed of triangular frames which are mounted to turn about vertical axes. The pivot shaft of each bracket is upright and journaled at its ends in the deck and in a bearing carried by the forwardly sloping suspension frame 21, as shown in Fig. 1ª. The lower outer end of each bracket frame carries the sheave (37 or 38) over which the rope or cable (33 or 34) at that side of the dredge is passed, and these ends of the bracket frames are connected by means of guy ropes or chains 41, 42 with the excavator ladder 19 at points near the lower tumbler, as shown in Figs. 1 and 2.

At the stern of the hull there is provided a trailing spud 43, of well known form, actuated by means of a rope 44 from the main engine 15, as best shown in Fig. 1.

The mode of operation of the improved dredge is as follows:—When the excavation is in progress both of the digging spuds are firmly anchored in the earth, and as the hull is only attached to the spud girder or cross beam by means of the pintle or pivot and swinging tackle above described, the spud girder and spuds act as a separate and stationary structure firmly planted in the earth, and upon which the swinging machinery of the dredge comprising the winch drum 32 and the ropes or cables 33, 34 can pull in such a way as to force the digging buckets in lateral direction into the cut. When all of the excavation within reach of the digging buckets is finished it is only necessary to swing back the dredge so that it stands parallel with the axis of the canal, after which the stern spud 43 is forced into the bottom. This trailing spud serves merely to hold the dredge in line with the canal and prevent it from swinging laterally under the influence of the wind when one of the digging spuds 26 is raised. When the stern spud is down and the dredge is to be advanced, it is only necessary to raise one of the digging spuds and then haul in the swinging rope (33 or 34) on the same side as the raised spud. Through the connection of said rope with the lateral bracket and excavator ladder as hereinbefore described the free end of the spud girder will be moved forwardly relatively to the hull, the other spud which still remains in the earth acting as a pivot while the entire dredge hull will be moved forward one-half of the distance moved through by the free end of the spud girder, it being remembered that the pivot is arranged at the center of said girder. This movement of the hull is shown diagrammatically in Fig. 7, in which the oblique position reached by the spud girder is indicated in dotted lines. The elevated or free spud is then lowered into the earth and the other one raised, after which the swinging tackle at the opposite side of the dredge is hauled in in the same way, thus moving the dredge forward until the spud girder is at right angles to the axis of the canal, as is also indicated in dotted lines in Fig. 7. The second digging spud is then run down into the earth, the stern spud is raised, and the dredge is ready for another traverse.

The object of the lateral bracket at the bow which is interposed between the girder and the excavator ladder is to act as a deflector in the tension member, considered as a whole, extending from the end of the spud girder to the ladder near the lower tumbler. If this tension member were to consist solely of the swinging tackle, it would foul the bow of the dredge when the ladder is in low positions. By interposing a swinging bracket on each side, the swinging tackle is kept in a horizontal position and clear of the hull, while the connection to the ladder consists of a single strand of heavy rope or chain, as previously described.

During the movement of the spud girder or cross beam relatively to the hull the former is supported in rolling contact with the latter by means of small rollers 22ˣ applied to the under surface of the spud girder near the ends, as shown in Fig. 4. In this manner the spud girder not only moves over the deck with a minimum of friction, but it is prevented from bending or buckling under the downward pull on the ends of the girder due to the anchoring of the dredge.

The above described method of moving ahead is not the only one which can be employed. The stern spud can be rigged as a walking spud, as clearly described in Patent No. 428,141, granted on May 20, 1890 to A. W. Robinson, and such a spud furnishes the power to move the dredge ahead by its own mechanism. When such a spud is employed, both of the digging spuds can be raised at once, if desired, and the dredge pushed ahead by the stern spud.

A variation in the arrangement of the digging spuds is illustrated diagrammatically in Fig. 6. Such a construction is used in digging canals where there is a sloping bank, which can be taken hold of with better advantage by a sloping spud than by a vertical spud. The two sloping spuds 45 and 46 extend through the ends of a cross beam or girder 47, and said spuds intersect each other near the center of the dredge. Said spuds are slidable through sleeves or casings 48 extending upward from the girder 47 and located on opposite sides of the pintle-post 49 which extends upward from the center of the girder. In this way a more economical arrangement of the spud girder and supporting frame is obtained, as the intersection of the spud casings with the central pintle on which the spud frame revolves avoids heavy torsional strains, which must be taken by the girder when the spuds are vertical. The spuds are provided at their lower ends with feet 50 adapted to take hold of the sloping bank of the canal, such feet being articulated by means of the universal joints 51, and also being provided with knife edges 52 which are forced into the bank in order to hold said feet firmly in position.

So far as we are aware, we are the first to provide a dredge with an independent pivot structure which is mounted on the deck and carries the digging spuds, said structure being connected with means by which the dredge may be swung to and fro, and our claims should receive a correspondingly broad interpretation.

It is obvious that changes in the details of the construction, such, for instance, as in the location of the winch drums for operating the digging spuds and swinging tackle, and the engine for operating said drums, may be made without departing from the scope of the invention.

What we claim is:—

1. A dredge having advancing and traversing means including a laterally swinging transversely-extending element on the deck of the dredge, and power operated cables connecting said element with opposite sides of the dredge hull.

2. A dredge having advancing means which comprises an anchoring structure extending across and swiveled on the deck.

3. A dredge having an anchoring structure mounted on and extending across the deck thereof and carrying digging spuds by which the dredge is anchored, and means to swing the dredge laterally with respect to said structure.

4. A dredge having an anchoring structure extending across the deck, and means for swinging the dredge with respect to said structure to traverse the dredge.

5. A dredge having an anchoring structure pivoted to the deck thereof, power operated mechanism connected directly with said structure and by means of which the dredge is swung laterally in either direction with said anchoring structure as a stationary pivot, and excavating mechanism carried directly by the dredge hull.

6. A dredge having an anchoring structure pivoted on the deck thereof, digging spuds carried by said structure at opposite sides of the hull and operative to anchor said structure firmly in the earth, and means for swinging the dredge with respect to said structure when the latter is anchored.

7. In a dredge, the combination of a hull, an excavator carried thereby, a structure carried by the dredge and by means of which it is anchored, and means connected directly to said structure to swing the dredge with respect to the latter and thereby force the excavator laterally into the cut.

8. In a dredge, an excavator at the bow of the hull, an anchoring structure carried by and extending across the hull, and swinging mechanism in connection with said anchoring structure and by means of which said excavator is forced into the cut.

9. In a dredge, a cross beam or girder traversing the deck of the dredge and provided at opposite ends with anchoring devices, and mechanism to swing the dredge as a whole in lateral direction with respect to said cross beam or girder.

10. In a dredge, a cross beam or girder swiveled to the deck of the hull and extending at both ends beyond the sides of the hull, digging spuds carried by the ends of the cross beam or girder, and swinging mechanism connecting said cross beam or girder with the bow of the hull.

11. In a dredge, a cross beam or girder swiveled to the deck of the hull and extending at both ends beyond the sides of the hull, digging spuds carried by the ends of said cross beam or girder, and swinging mechanism connecting said cross beam or girder with the bow of the hull, comprising power operated cables at opposite sides of the dredge.

12. In a dredge, a spud-carrying cross beam or girder, and swinging machinery comprising cables connecting the ends of said girder with opposite sides of the hull.

13. In a dredge, a girder swiveled on the hull, anchoring spuds at the ends of said girder, power operated mechanism to raise and lower said spuds, and power operated mechanism to swing the dredge as a whole with respect to the spud girder when the latter is anchored.

14. In a dredge, a spud girder swiveled on the deck and extending at its ends beyond the sides of the hull, digging spuds carried at the ends of said girder, and operating mechanism for said spuds comprising winch drums on the girder.

15. In a dredge, a hull, a spud girder swiveled thereto and extending at its ends beyond the sides of the same, digging spuds carried at the ends of said girder, operating mechanism for said spuds comprising winch drums on the girder, and a third winch drum on the girder having connections with the girder and hull by means of which the latter can be swung bodily with respect to the girder when said spuds are lowered.

16. In a dredge, a spud girder which extends across the deck and is swiveled thereto, digging spuds carried by said girder, mechanism for swinging the hull with respect to said girder when the latter is anchored, and a trailing spud at the stern of the dredge.

17. In a dredge, a spud girder which traverses the deck and is swiveled thereto, lateral brackets at the bow of the hull, a power operated winch drum on said girder, and cables passing from said drum and forming a connection between the ends of the girder and said lateral brackets.

18. In a dredge, an endless bucket excavator at the bow of the hull, an anchoring girder on the deck of the hull and with respect to which the hull has a swinging movement, and connections between said girder and the ladder of said excavator.

19. In a dredge, an endless bucket excavator at the bow of the hull, laterally swinging brackets projecting from the sides of the bow, an anchoring girder swiveled to and traversing the deck, mechanism by which the hull is swung bodily with respect to said girder, and comprising power operated cables connected with said lateral brackets, and guy ropes connecting said brackets with the ladder of the excavator.

20. In a dredge, a girder swiveled to the deck, spuds carried by the ends of said girder, means to raise one of said spuds, and means to advance the free end of the girder.

21. In a dredge, a girder swiveled to the deck and extending across the same, digging spuds carried by the girder at the ends of the latter, and means for pulling one end of said girder in forward direction when the spud at that end is raised.

22. In a dredge, a girder swiveled to the deck and extending across the same, digging spuds carried by the girder at the ends of the latter, means for pulling one end of said girder in forward direction when the spud at that end is raised, and means at the stern of the dredge to prevent the lateral movement of the dredge though permitting its advance.

23. In a dredge, a girder swiveled to the deck and extending across the same, digging spuds carried by the girder at the ends of the latter, means for pulling one end of said girder in forward direction when the spud at that end is raised, and a trailing spud at the stern of the dredge.

24. In a dredge, a girder which traverses the hull and is swiveled thereto, anchoring devices at opposite ends of said girder, and means for advancing the free end of the girder when one of such anchoring devices is inoperative.

25. In a dredge, a girder which traverses the hull and is swiveled thereto, anchoring devices at opposite ends of said girder, and means for advancing the free end of the girder when one of such anchoring devices is inoperative, comprising a power operated cable connection between the end of the girder and the bow of the dredge.

26. In a dredge, a girder which extends across the hull and is swiveled to the deck, spuds carried by the opposite ends of said girder, power operated mechanism for raising and lowering each spud, power operated cable connections between the ends of the girder and the bow of the hull, and a trailing spud at the stern of the dredge which prevents the lateral deviation of the hull during its advance.

27. In a dredge, a laterally swinging anchoring structure on the deck having means to anchor the dredge at opposite sides of the hull, and means in connection with said structure to swing the dredge to and fro for traversing and to effect the advance of the dredge.

28. In a dredge, a laterally swinging anchoring structure on the deck operative to anchor the hull at opposite sides, and power operated mechanism acting in conjunction with said structure to traverse the dredge and also to advance the same.

In testimony whereof we affix our signatures, in presence of witnesses.

WALTER FERRIS.
PAUL REVERE PARKER.

Witnesses as to Walter Ferris:
   FLORENCE J. BUEHLER,
   HARRY B. HAYDEN.

Witnesses as to Paul R. Parker:
   ADELINE COPELAND,
   WILLIAM ROSCOE BASSICK.

---

Copies of this patent may be obtained for five cents each, by addressing the "Commissioner of Patents, Washington, D. C."